United States Patent
Wei

(10) Patent No.: US 6,861,789 B2
(45) Date of Patent: Mar. 1, 2005

(54) BACK LIGHT UNIT INCLUDING A DIFFUSER WITH VARIOUS DIFFUSION EFFECTS

(75) Inventor: Chung-Kuang Wei, Tainan (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 132 days.

(21) Appl. No.: 10/065,289

(22) Filed: Oct. 1, 2002

(65) Prior Publication Data

US 2003/0146680 A1 Aug. 7, 2003

(30) Foreign Application Priority Data

Feb. 7, 2002 (TW) ........................................ 91102276 A

(51) Int. Cl.$^7$ ............................. H01J 5/16; G02F 1/133
(52) U.S. Cl. ..................... 313/116; 313/264; 313/493; 313/290; 362/31; 362/330; 362/223; 362/561; 349/86; 349/112; 349/113; 349/61; 349/64
(58) Field of Search ................................. 313/116, 113; 362/31, 330, 331, 339, 223, 355; 349/112, 113, 86, 61, 64; 359/615

(56) References Cited

U.S. PATENT DOCUMENTS

| | | | |
|---|---|---|---|
| 4,832,458 A | 5/1989 | Fergason et al. | ............... 349/56 |
| 5,580,932 A | 12/1996 | Koike | ......................... 525/276 |
| 5,629,785 A | 5/1997 | Valliath et al. | ............... 349/86 |
| 5,881,201 A | 3/1999 | Khanarian | .................... 385/146 |
| 6,215,535 B1 | 4/2001 | Nakajima et al. | ............. 349/86 |

FOREIGN PATENT DOCUMENTS

| | | | |
|---|---|---|---|
| EP | 918247 A2 | 5/1999 | ......... G02F/1/1335 |
| JP | 2002062528 A | 2/2002 | |

*Primary Examiner*—Ashok Patel
*Assistant Examiner*—Sikha Roy
(74) *Attorney, Agent, or Firm*—Winston Hsu

(57) ABSTRACT

A backlight unit is disposed beneath a display panel. The backlight unit includes an illumination means, which is used to provide a light source, and a diffuser positioned between the illumination means and the display panel, which is used to scatter the light generated by the illumination means. The diffuser, which is composed of liquid crystal particles and polymer, has a plurality of regions. The region that is closer to the illumination means has greater scattering effect. In addition, the region with the greatest scattering effect has a shape corresponding to the illumination means.

10 Claims, 4 Drawing Sheets

BACK LIGHT UNIT INCLUDING A DIFFUSER WITH VARIOUS DIFFUSION EFFECTS

BACKGROUND OF INVENTION

1. Field of the Invention

The present invention relates to a back light unit, and more particularly, to a diffuser of a back light unit.

2. Description of the Prior Art

As manufacturing costs decrease and quality improves, liquid crystal displays are widely applied to different kinds of products such as notebooks, personal digital assistants (PDAs), mobile phones, clocks, and so on. Since the liquid crystal displays are passive luminous devices, a back light unit is required for the LCD devices to meet the requirements of night vision and full color imagery.

Basically, the back light unit, which is disposed under the display panel, comprises a luminous means and a diffuser for generating light beams and scattering the light beams uniformly to the display panel so as to produce image on the display panel in advance. According to the position of the luminous means, the back light units are divided into several types, such as the vertical back light unit, in which the light source is generated under the display panel, or the edge type back light unit, in which the light source is projected from the edges. Among all kinds of back light units, since the vertical back light unit generates light beams under the display panel, therefore, the vertical back light units are widely used in large size display panels or those display panels which need high brightness, such as TV sets.

Please refer to FIG. 1 of a schematic diagram of a conventional vertical back light unit 10. The back light unit 10 is disposed under a display panel 18 for providing a light source to the display panel 18. The back light unit comprises a light generator 12 for producing light beams, and a reflective layer 14, which is often composed of a metal layer, for reflecting the light beams generated from the light generator 12 upward to increase the luminous intensity. The back light unit further comprises a diffuser 16 disposed above the light generator 12 for scattering the light beams so that the uniformity of the luminous intensity is improved when the light beams are provided to the display panel 18.

Please refer to FIG. 2 of a top view of the light generator 12. Basically, the light generator 12 is composed by one or a plurality of light tubes 13. In order to increase efficiency, the light tubes 13 usually occupy only parts of the region of the light generator 12 and leave a lot of unoccupied space. Therefore, the light beams generated by the light generator 12 are scattered in various directions. The regions closer to the light tubes 13 have higher luminous intensities. Although the light beams are scattering through the diffuser 16 disposed on the light generator 12 so that the differences among the luminous intensity of each region are reduced, some specific regions, which are too close to the light tubes 13 such as the regions located on the tubes 13 directly, still have relative higher luminous intensities. Thus, when the display panel is used, a highlight region is shown on the specific regions of the display panel 18, which corresponds to the shapes of the tubes 13. The display performance of the display panel 18 is deteriorated.

In conventional back light unit technologies, some methods are used for solving the aforementioned problem. For example, an additional light guide is positioned between the diffuser 16 and the light generator 12 or a light enhancing film is disposed between the diffuser 16 and the display panel 18 for reducing the difference of the luminous intensities in advance. Those methods work successfully when the back light unit 10 outputs light beams with a high luminous intensity. However, when the back light unit 10 outputs light beams with a low luminous intensity or when the screen is almost dark, an obvious highlight region, which has a shape similar to the shape of the light tubes 13, is always shown on the display panel 18 and therefore the display performance is deteriorated.

SUMMARY OF INVENTION

It is therefore a primary objective of the claimed invention to provide a back light unit with a diffuser which has diffusing effects corresponding to the shapes and positions of the light tubes so as to solve the aforementioned problem.

In a preferred embodiment, the claimed invention provides a back light unit disposed under a display panel. The back light unit comprises a light tube, which is used to provide a light source, a reflective layer disposed under the light tube, which reflects the light generated from the light tube upward to increase outputting brightness, and a diffuser positioned between the light tube and the display panel, which is used to scattering the light beams generated by the light tube. The diffuser composed of liquid crystal particles and polymer comprises a plurality of regions with different scattering effects. The region which is closer to the tube has greater scattering effects. In addition, the region with the greatest scattering effects has a shape corresponding to the light tube.

It is an advantage of the claimed invention that the back light unit comprises a diffuser composed of liquid crystal molecules and polymers. The diffuser has a greater scattering effect in the region closer to the tube so as to provide light beams with a better uniformity to the display panel.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
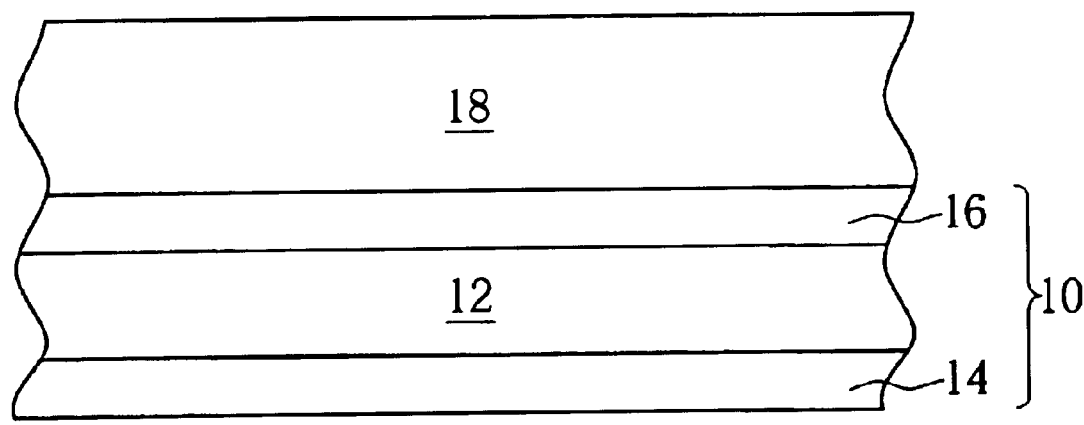
FIG. 1 is a cross-sectional diagram of a conventional back light unit.
Figure 2:
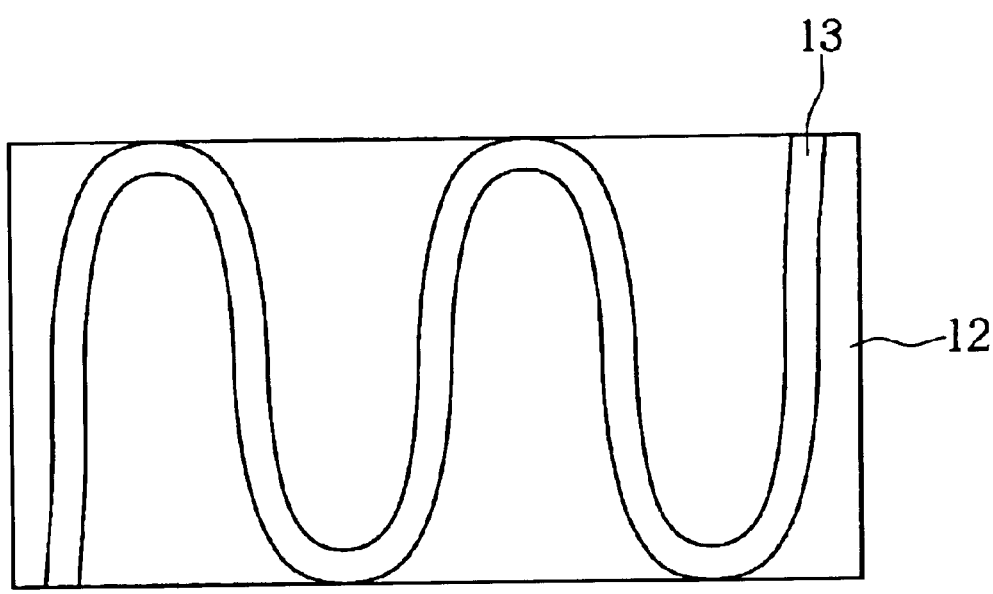
FIG. 2 is a schematic diagram of a light generator shown in FIG. 1.

The present invention focuses on a diffuser structure of a back light unit. The remaining structure of the back light unit of the present invention is similar to the conventional back light unit 10, and will not be explained again fully. Please refer to FIG. 3 of a cross=sectional diagram of a back light unit 110 according to the present invention. The back light unit 110 is disposed under a display panel 118 for providing light source to the display panel 118. The back light unit 110 comprises a light source generator 112 for generating light beams and a diffuser 116 disposed on the light source generator 112. The diffuser 116 is composed of liquid crystal molecules and polymers. Since the refraction of the liquid crystal molecules and polymers is anisotropic, when the light beams generated from the light source generator 112 pass through the diffuser 116, the light beams will be refracted by the diffuser 116 so that light beams with a better uniformity can be provided to the display panel 118. Moreover, in order to increase the output brightness of the back light unit 110, an additional reflective layer 114 is often disposed under the light generator 112. The reflective layer 114, which may be composed of a metal layer, is used to reflect the light beams generated form the light source generator 112 upward so as to increase the output brightness.

Figure 3:
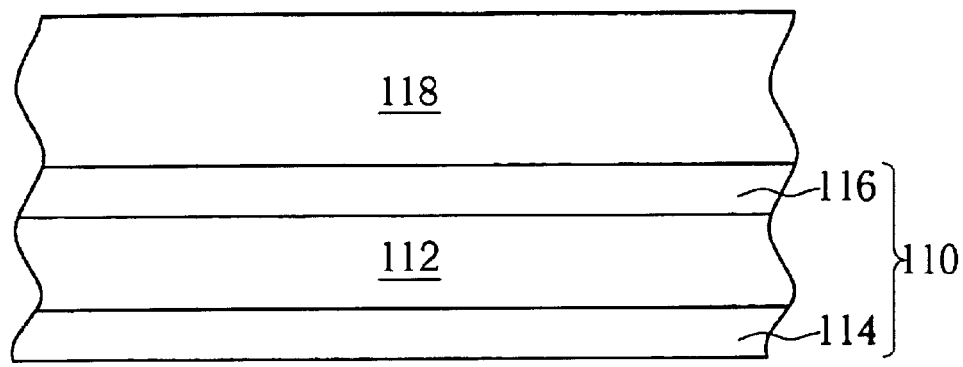
FIG. 3 is a cross-sectional diagram of a back light unit according to the present invention.
Figure 4:
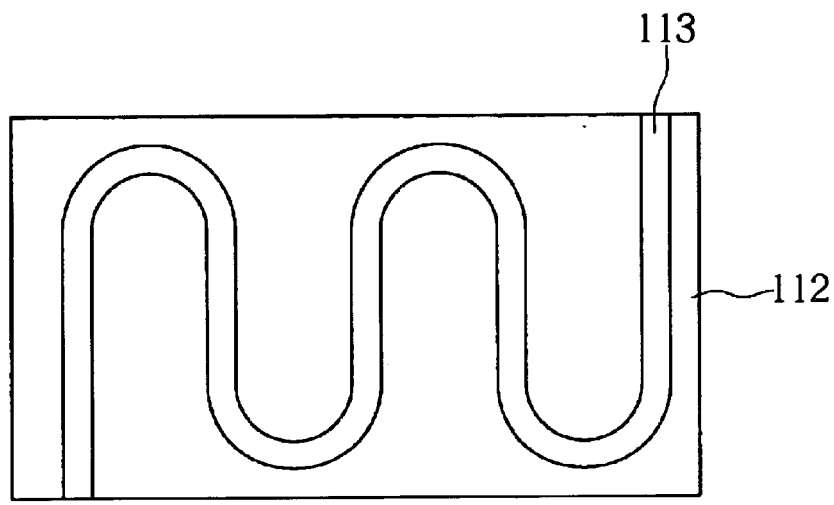
FIG. 4 is a schematic diagram of the light generator shown in FIG. 3.
Figure 5:
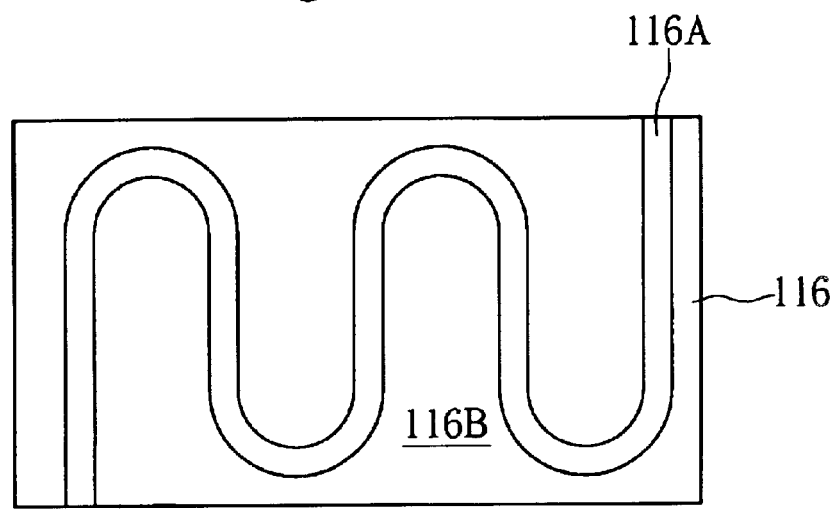
FIG. 5 is a schematic diagram of the diffuser shown in FIG. 3.

Please refer to FIG. 4 of a top view of the light source generator 112 shown in FIG. 3. Generally speaking, the light source generator 112 is composed of one or a plurality of light tubes 113. The light tubes 113 may have specific shapes as shown in FIG. 3 or any other shapes. In order to increase efficiency, the light tubes 113 usually occupy only parts of the region of the light generator 112 and leave a lot of unoccupied space. Therefore, the light output from the light generator 112 is not uniform, and varies according to locations. A region closer to the light tubes 113 has a higher luminous intensity. Please refer to FIG. 5 of the diffuser 116 shown in FIG. 3. As shown in FIG. 5, the diffuser 116 comprises a first region 116A and a second region 116B. An interval between the light tubes 113 and the first region 116A is smaller than that between the tubes 113 and the second region 116B. The diffusing effect of the first region 116A is better than that of the second region 116B. Therefore, the outputting light of the back light unit 110 is more uniform after passing through the diffuser 116. In addition, according to requirements of display panel 118, the diffuser 116 of the present invention may comprise a plurality of regions with different scattering effects by using photo masks with different designed patterns or any other exposure methods.

In the preferred embodiment of the present invention the first region 116A has a shape corresponding to the shapes of the light tubes 113. For example, the area overlapping with the light tubes 113 is defined as the first region 116A. Thus, the light beams with high luminous intensity surrounding the light tubes 113 are scattered by the first region 116A, which has a higher scattering effect. Therefore, a more uniform light output can be obtained via the diffuser 116.

Figure 7:
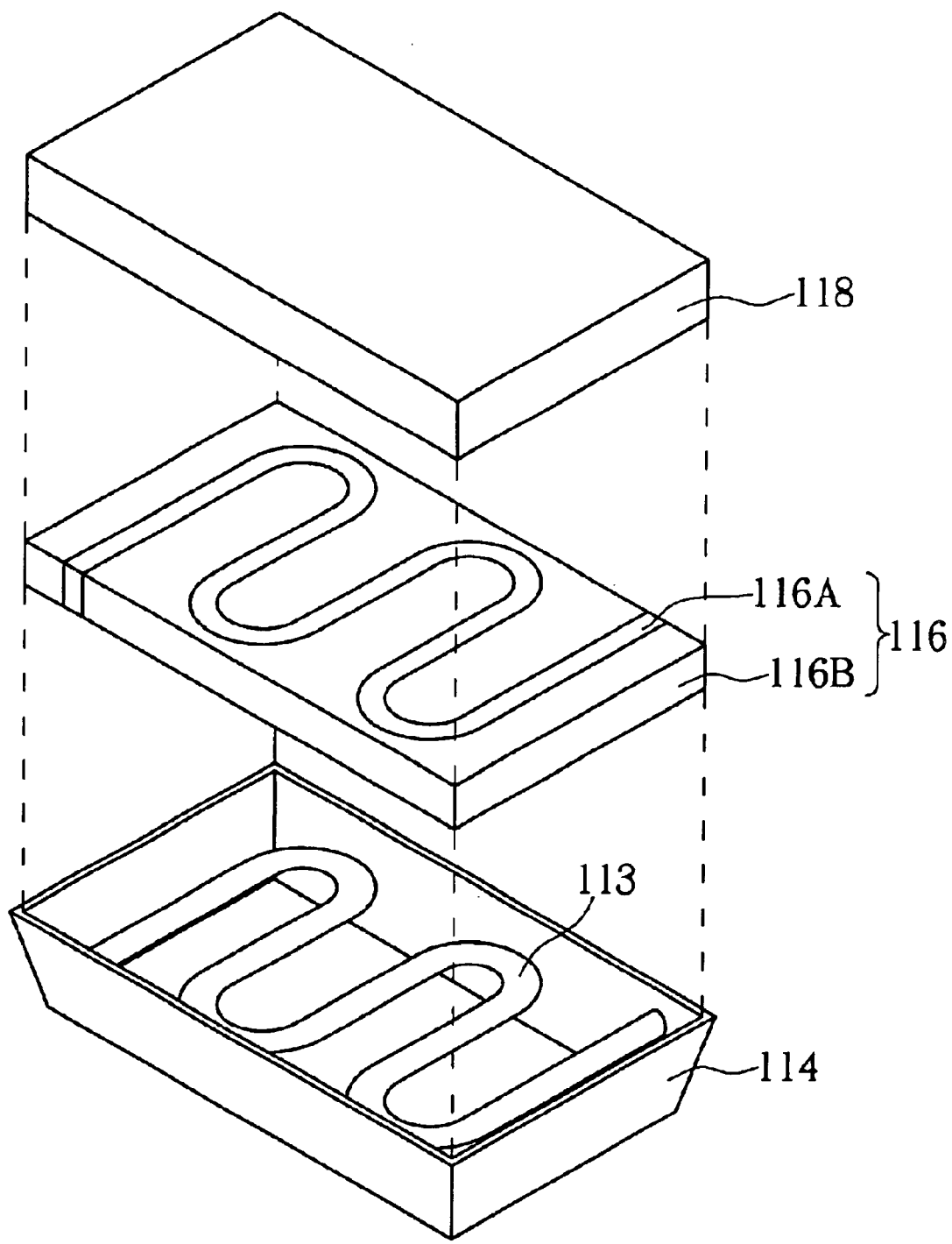
FIG. 7 is a schematic diagram of the backlight unit with the luminous source and the diffuser having region with greater diffusion effect closer to the luminous means according to the present invention.

In the preferred embodiment of the present invention as shown in FIG. 7, the diffuser 116 is composed of liquid crystal molecules and polymers. The manufacturing method thereof includes first filling the mixed monomer and liquid crystal molecules. Then, a curing process is performed by irradiation under UV light. When UV light with higher intensity is used, the liquid crystal molecules form smaller liquid crystal droplets, which have a higher refraction index. A first region 116A and a second region 116B are defined by using photo masks during the curing process. Furthermore, the two regions 116A and 116B can be irradiated under the UV light with different intensities so that liquid droplets with different sizes are formed in the two regions. In the embodiment of the present invention, the first region 116A, which is composed of liquid crystal droplets with smaller sizes, has a higher refraction index than the second region 116B. Because the refraction index distribution in the diffuser 116 corresponds to the shape of light tubes 113, the uniformity of the light through the diffuser 116 can be improved. In addition, when the diffuser 116 is fabricated, the sizes of liquid crystal droplets or the diffusing effect of the diffuser 116 can be adjusted or set properly to an optimized condition according to the distribution of the brightness of the light tubes 113 so as to improve the uniformity of light output in advance. In the preferred embodiment of the present invention, the size of the liquid crystal droplets is about 0.1 to 1 $\mu$m.

Figure 6:
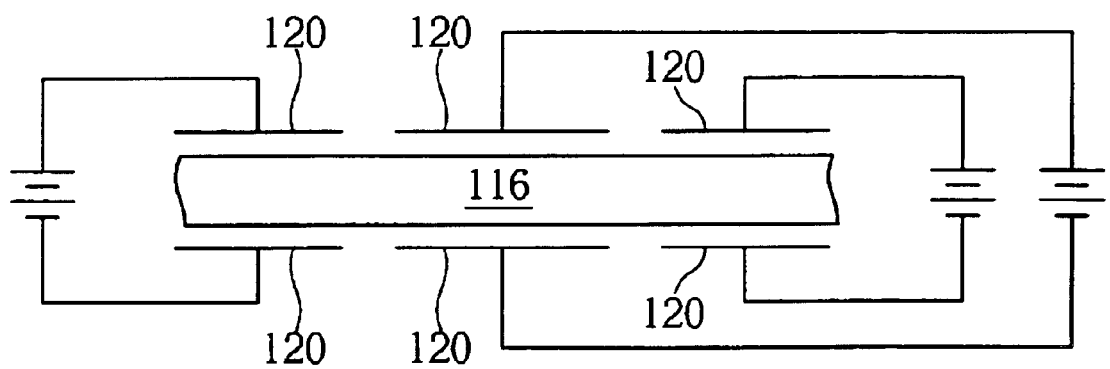
FIG. 6 is a schematic diagram of the electrode plates in an embodiment of the present invention.

However, the luminous intensity of the light tubes 113 may be varied due to aging of materials. In addition, sometimes the brightness of the light tubes 113 is also adjusted for display performance according to the change of the screen or environment. Therefore, once the relationship between the diffusing effect of the diffuser 116 and the luminous intensity of the light tubes 113 changes from the original optimized design, the display performance may be deteriorated. Thus, in the preferred embodiment of the present invention, the diffuser 116 is an electrically variable diffuser composed of polymer dispersed liquid crystals (PDLC). As shown in FIG. 6, at least one pair of electrode plates 120 is used, with one electrode plate 120 being disposed on each side of the diffuser 116. The electrode plates 120 are electrically connected to a power supply so as to provide an external electric field to the diffuser 116. The polymer dispersed liquid crystal is a kind of nematic liquid crystal and the refraction index of the liquid crystal molecules is variable according to the electric field applied thereon. The pattern of the electrode plates 120 can be designed properly to fit the requirement of the back light unit 110, for example the pattern of the electrode plates 120 may correspond to the shapes of the tubes 113. Thus, when the brightness of the light tubes 113 varies due to aging materials or some other reasons, the external electric field can be adjusted so as to modify the diffusing effect of the diffuser 116. Therefore, a new optimized relationship between the diffusing effect of the diffuser 116 and the brightness of the light tubes 113 can be made.

In contrast with the conventional back light unit, the diffuser in the back light unit of the present invention can be adjusted properly according to the shapes or positionsof the tubes. Since the regions closer to the tubes have greater diffusion effect, the uniformity of the output light distribution can be improved. In addition, the present invention also provides an electrically variable diffuser which is composed of dispersed polymer liquid crystal molecules. Thus, the diffusing effect of the diffuser can be further adjusted by the electric field applied thereon according to the brightness of the tubes so as to solve the aforementioned problem of light tube brightness variation caused by aging.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A back light unit disposed under a display panel, the back light unit comprising: a luminous means as a light source for providing light beams; and a diffuser interposed between the luminous means and the display panel for diffusing the light beams to the display panel, wherein the diffuser is composed of liquid crystal molecules and polymers and comprises a plurality of regions with different diffusion effects;

wherein a region with greater diffusion effect is closer to the luminous means than that with smaller diffusion effect.

2. The back light unit of claim 1 wherein regions with different diffusion effects are formed of liquid crystal droplets with different sizes.

3. The back light unit of claim 1 wherein the region which is closer to the luminous means is composed of smaller liquid crystal droplets.

4. The back light unit of claim 1 wherein a location of the regions with greatest diffusion effect corresponds to a location of the luminous means.

5. The back light unit of claim 1 wherein a shape of the regions with greatest diffusion effect corresponds to a shape of the luminous means.

6. The back light unit of claim 1 wherein the diffusion effect of the diffuser changes according to an electric field applied thereon.

7. The back light unit of claim 6 wherein the back light unit further comprises at least one pair of electrode plates, with one plate disposed on each side of the diffuser for applying an electric field to the diffuser.

8. The back light unit of claim 7 wherein the electric field is according to a luminous intensity of the luminous means.

9. The back light unit of claim 1 wherein the diffuser is composed of polymer dispersed liquid crystal (PDLC) molecules.

10. The back light unit of claim 1 wherein the back light unit further comprises a reflective layer disposed under the luminous means for reflecting the light beams to the diffuser.

* * * * *